UNITED STATES PATENT OFFICE.

WILLIAM BACHMAN CHISOLM, OF CHARLESTON, SOUTH CAROLINA.

FERTILIZER.

No. 824,280.          Specification of Letters Patent.          Patented June 26, 1906.

Application filed September 19, 1904. Serial No. 225,102.

*To all whom it may concern:*

Be it known that I, WILLIAM BACHMAN CHISOLM, a citizen of the United States, residing in Charleston, county of Charleston, State of South Carolina, have invented certain new and useful Improvements in Fertilizers; and I do hereby declare the following to be a full, clear, and exact description of the invention, such as will enable others skilled in the art to which it appertains to make and use the same.

My invention relates to certain new and useful improvements in fertilizers, and has for its object the production of a fertilizer which in part subserves the function of a germicide and which, while of greatly decreased cost of production in comparison with the ordinary phosphatic fertilizers now on the market, is of largely increased efficiency in use and is practically without destructive effect upon any kind of crop or of the bagging or the like in which it may be stored or transported.

Prior to my invention it has been customary in the manufacture of phosphatic fertilizer to grind fossil or bone phosphate in a suitable mill to a degree sufficient to pass through a relatively coarse sieve of, say, eighty to ninety meshes to the square inch, and to then add to the ground material a like weight of sulfuric acid for the purpose of converting the insoluble phosphate into a soluble form adapted to support and nourish plant life. In practice it is found expedient to grind the phosphate finer than the degree specified, for the reason that when so ground there is a great tendency to "ball up" and access of the acid to the rock particles is prevented, resulting in an incomplete solution and a more or less acid and wet mass, which is apt to destroy the bags in which it is shipped and which it is very difficult, if not impossible, to properly distribute in the field.

In the practice of my invention I dispense entirely with the use of sulfuric acid in the production of the fertilizer, thereby eliminating it as an item of expense and as an element of possible detriment to the distributing and storing capacity of the fertilizer. In lieu thereof I employ sulfur in a finely-divided condition. This I am enabled to do the more effectually for the reason that I have discovered that ordinary lump sulfur, (seconds,) although incapable of being effectively ground by itself to the required degree, may be so ground when associated in a crushed condition with the crushed phosphate. This discovery results in an enormous saving, in respect to the cost of the sulfur employed, over the employment of the much more expensive flowers of sulfur sometimes used as a germicide and has the additional advantage of insuring an absolutely uniform and intimate admixture of the ground phosphate and sulfur in the resultant form of an almost impalpable powder—a result impossible of attainment except by grinding the two ingredients together.

As above intimated, the phosphate rock and the sulfur are first passed together through a preliminary crusher, reducing them to the average size of, say, a pea or bean. The crushed rough mixture is then admitted into a pulverizing-mill of the Lucop or other suitable type and is reduced therein to an impalpable powder, any tailings being returned to the mill for further grinding. The resultant is an intimate and uniform admixture of phosphate rock and sulfur in the form of an almost impalpable powder and in an absolutely dry condition. I find that the percentage of sulfur, by weight, to give effective results may in some instances be as low as forty pounds to the ton of the mixture—*i. e.*, forty pounds of sulfur to nineteen hundred and sixty pounds of phosphate rock—and in other instances from sixty to one hundred pounds of sulfur to the ton of mixture; but I do not desire to limit myself to these exact proportions, as it is obvious that they may be varied to a greater or less degree without departing from the spirit of my invention. The mixture is homogeneous in the sense that the grinding operation has so intimately admixed its particles and brought them to such a fineness and equality of size that they are evenly distributed throughout the mass and incapable of segregation. This mixture is itself a separate article of manufacture and sale, adapted to be admixed with nitrogen and potash, or either of them, or materials containing either or both, according to the particular necessities of the soil and the character of the crop to be planted. This admixture can be properly effected only at the factory by grinding the nitrogen or potash bearing materials, or both of them, in a mill of similar type to that wherein the phosphate rock and sulfur were ground and together with the ground mixture of rock and sulfur, so that on its exit from this latter grinding and mixing mill the product will still have the form of an almost impalpable powder, but one wherein the ground rock and sulfur will be intimately associated with the added ingredient or ingredients.

In practice I have found that a suitable fertilizer for potatoes may be compounded from eight hundred pounds of the ground mixture of phosphate rock and sulfur, ground together with six hundred pounds of cotton-seed meal, four hundred pounds of kainite, and two hundred pounds of commercial nitrate of soda, the cotton-seed meal furnishing about eight per cent. of ammonia, the commercial nitrate of soda furnishing about nineteen per cent. of ammonia, and the kainite furnishing about twelve per cent. of potash. For wheat the relative percentages of desirable ingredients would be, say, eight hundred pounds of the ground mixture of phosphate rock and sulfur, ground together with eight hundred pounds of cotton-seed meal and four hundred pounds of kainite. For cotton the relative percentages of desirable ingredients would be, say, eight hundred pounds of the ground mixture of phosphate rock and sulfur, six hundred pounds of cotton-seed meal, four hundred pounds of kainite and two hundred pounds of commercial sulfate of magnesia. I give these individual instances as generally typical of appropriate mixtures adapted for use for the particular crops specified.

In the practical use of my invention I find that the crops produced are apparently far superior to what might reasonably be expected from the amount of "available phosphate," nitrogen, and potash or other ingredients present in the final mixture. This may be due in part to the extreme fineness and intimate association of the admixed particles tending to facilitate their ready and uniform distribution through the soil, their chemical interaction under the influence of the moisture of the soil and the infiltrations of rain, and their increased solubility in said condition of impalpable powder; but I am further led to believe that the sulfur itself has an independent effect as a germicide, destroying bacterial and insect life prejudicial to the plant and either not interfering with or positively stimulating helpful bacteria. I may state, further, that in my opinion the efficacy of the ground mixture of phosphate and sulfur is largely, if not wholly, dependent upon the employment therewith of the additional potash or nitrogen supplying ingredient. In fact, without the coöperation of the one or the other (generally both) a mere mixture of finely-divided phosphate and sulfur would be comparatively ineffective as a fertilizer, and even a ground mixture thereof in the form of a substantially impalpable powder would possibly exercise its functions but slowly. I prefer, therefore, that there should always be present in the mixture when applied to the soil either the one or the other (and sometimes both) of these added ingredients, and I regard as a part of my present invention the discovery that the addition of potash or of nitrogen to a mixture of finely-divided phosphate and sulfur (whether ground together or not) results in a stimulating and effective utilization of the mixture, where it would otherwise remain almost inert or but slowly active.

Having thus described my invention, what I claim is—

A fertilizer, having as a constituent part, a ground mixture in the form of a substantially impalpable powder of phosphate and sulfur; substantially as described.

In testimony whereof I affix my signature in presence of two witnesses.

WILLIAM BACHMAN CHISOLM.

Witnesses:
JOHN D. MULLER
L. W. WHITING.